R. LOUIS & W. DRECHSLER.
ANTISEPTIC THERMOMETER CASE.
APPLICATION FILED JULY 24, 1915.
1,199,399.
Patented Sept. 26, 1916.
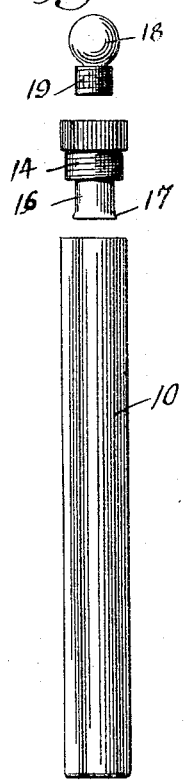
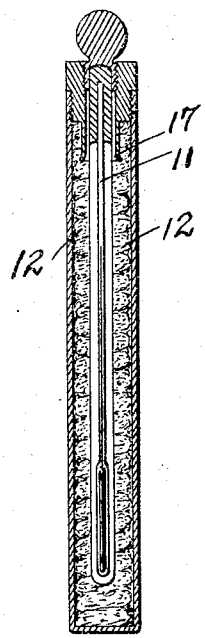

UNITED STATES PATENT OFFICE.

ROBERT LOUIS AND WILLIAM DRECHSLER, OF DENVER, COLORADO.

ANTISEPTIC THERMOMETER-CASE.

1,199,399.  Specification of Letters Patent.  Patented Sept. 26, 1916.

Application filed July 24, 1915. Serial No. 41,633.

*To all whom it may concern:*

Be it known that we, ROBERT LOUIS and WILLIAM DRECHSLER, of the city and county of Denver, in the State of Colorado, have invented certain new and useful Improvements in Antiseptic Thermometer-Cases, of which the following is a specification.

Our invention relates to devices for carrying clinical thermometers and the like adapted to keep them aseptic for use.

In the accompanying drawings which represent a form of the embodiment of our invention which we have selected for illustration, Figure 1 represents a side elevation of a device embodying our invention; Fig. 2 represents a similar view with the parts disassembled; and Fig. 3 represents a longitudinal vertical section of the same.

In carrying our invention into effect in the embodiment thereof illustrated in the said drawings and described in this specification, we provide a casing 10 of sufficient size to include a thermometer stem 11, a cylindrical wick 12 surrounding said stem, and a plug provided with external screw threads on a portion 14 thereof adapted to engage with internal screw threads at the upper end of the said casing. The plug is provided at its lower end with a nipple 16 which in turn is provided at its lower extremity with a flange 17 adapted to secure the cylindrical wick 12 at its upper end in order that the thermometer may not become entangled while being inserted or drawn out. The upper portion of said plug is of a size adapted to fit over and coincide with the sides of the casing 10. The plug is provided with a cylindrical opening through the same of suitable size to admit the thermometer stem. We also provide a member comprising a spherical upper portion 18 and a lower cylindrical portion 19 externally screw threaded so as to engage with internal screw threads in the upper part of said plug. A socket is formed in said cylindrical portion 19 adapted to receive the upper end of the thermometer stem which may be secured therein by wax or other suitable material, designated 20. The said upper member 18 and 19 is provided as a means of inserting and withdrawing the thermometer stem from the casing as hereinafter described.

The operation of this form of our invention is as follows:—The cylindrical wick 12 is attached to the plug by means of the nipple 16 and the flange 17 and is saturated with a suitable antiseptic liquid or other antiseptic substance; the plug is engaged with the casing 10 by means of screw threads as above set forth and the thermometer stem 11, which has previously been secured into the member 18 and 19, is inserted into the casing 10 thereby being brought adjacent to the cylindrical wick 12 and the antiseptic liquid or substance with which the said wick is saturated as above set forth.

The advantages of our invention will be obvious from what has been above set forth with regard to the construction and operation of the invention.

It is also obvious that our invention admits of various modifications, such for instance as the insertion in the thermometer case of a tube of glass or other non-corrosive material in which the wick may be contained.

Having thus described our invention, what we claim as new and desire to secure by Letters Patent is as follows:

1. In a case for thermometers and the like, the combination with a body portion and a closure for the end thereof, of an absorbent material located inside said body portion, adapted to be saturated with an antiseptic solution and a flange on the lower end of said closure adapted to secure said material.

2. In a case for thermometers and the like, the combination with a body portion and a closure for the end thereof, of an absorbent material located inside said body portion, adapted to be saturated with an antiseptic solution and means adapted to secure said material in the said body, said means comprising a hollow plug provided with screw threads to engage said body portion and a securing nipple at the lower end thereof.

3. In a case for thermometers and the like, the combination with a body portion and a closure for the end thereof, of an absorbent material located inside said body portion, adapted to be saturated with an antiseptic solution and means adapted to secure said material in the said body, said means comprising a hollow plug provided with screw threads to engage said body portion and a securing nipple at the lower end thereof and a retaining flange on the lower end of said closure.

4. In a case for thermometers and the like, the combination with a body portion and a closure for the end thereof, of an absorbent material inside said body portion adapted to be saturated with an antiseptic solution, means adapted to secure said material in the said body; the said material being perforated to allow the thermometer stem to be inserted and removed from said material without disturbing the position of the said material in said body portion.

In witneses whereof we have hereunto set our hands in the presence of two witnesses.

ROBERT LOUIS.
WM. DRECHSLER.

Witnesses:
 LESLIE I. APPEL,
 AMY A. LOUIS.

Copies of this patent may be obtained for five cents each, by addressing the "Commissioner of Patents, Washington, D. C."